(12) United States Patent
Wildey et al.

(10) Patent No.: US 11,832,999 B2
(45) Date of Patent: Dec. 5, 2023

(54) ROOT CANAL SEALING INSTRUMENT

(71) Applicant: William L. Wildey, Bridgeport, TX (US)

(72) Inventors: William L. Wildey, Bridgeport, TX (US); Steven S. Senia, San Antonio, TX (US)

(73) Assignee: William L. Wildey, Bridgeport, TX (US)

( * ) Notice: Subject to any disclaimer, the term of this patent is extended or adjusted under 35 U.S.C. 154(b) by 0 days.

(21) Appl. No.: 17/717,689

(22) Filed: Apr. 11, 2022

(65) Prior Publication Data
US 2023/0035283 A1    Feb. 2, 2023

Related U.S. Application Data

(60) Provisional application No. 63/228,440, filed on Aug. 2, 2021.

(51) Int. Cl.
*A61C 5/50*    (2017.01)

(52) U.S. Cl.
CPC ..................... *A61C 5/50* (2017.02)

(58) Field of Classification Search
CPC ....................................... A61C 5/50
See application file for complete search history.

(56) References Cited

U.S. PATENT DOCUMENTS

| | | | | |
|---|---|---|---|---|
| 3,330,040 A | * | 7/1967 | Kahn | A61C 5/44 433/102 |
| 4,457,710 A | * | 7/1984 | McSpadden | A61C 5/50 433/164 |
| 4,681,545 A | * | 7/1987 | Lapcevic | A61C 5/50 433/224 |
| 5,083,923 A | * | 1/1992 | McSpadden | A61C 5/50 433/81 |

(Continued)

FOREIGN PATENT DOCUMENTS

| | | |
|---|---|---|
| KR | 1019970069049 A | 11/1997 |
| KR | 1020160067277 A | 6/2016 |

(Continued)

OTHER PUBLICATIONS

International Search Report and Written Opinion for PCT International Application No. PCT/US2022/039046, dated Nov. 18, 2022, 7 pages.

*Primary Examiner* — Ralph A Lewis
(74) *Attorney, Agent, or Firm* — Dority & Manning, P.A.

(57) ABSTRACT

A root canal sealing instrument includes an elongated member that includes a shaft and a spiraled member. The root canal sealing instrument further includes a housing that encompasses at least a portion of the elongated member, wherein the housing is configured to slidably move with respect to the elongated member. The housing includes a proximal opening and a distal opening at opposing ends of the housing, wherein the proximal opening is closer to a proximal end of the elongated member than a distal end of (Continued)

the elongated member, and the distal opening is closer to the distal end of the elongated member than the proximal end of the elongated member. The housing further includes an interior chamber with a diameter at least as large as a first diameter of the spiraled member and a second diameter of the shaft.

19 Claims, 10 Drawing Sheets

(56) References Cited

U.S. PATENT DOCUMENTS

| | | | | |
|---|---|---|---|---|
| 5,098,298 | A * | 3/1992 | Johnson | A61C 5/50 433/81 |
| 5,286,193 | A * | 2/1994 | Roane | A61C 5/50 433/81 |
| 5,658,149 | A * | 8/1997 | Munce | A61C 5/40 433/102 |
| 5,752,825 | A * | 5/1998 | Buchanan | A61C 5/42 433/32 |
| 5,882,196 | A * | 3/1999 | Kert | A61C 5/50 433/81 |
| 6,261,099 | B1 * | 7/2001 | Senia | A61C 5/50 433/81 |
| 10,039,622 | B2 * | 8/2018 | Munce | A61C 8/0089 |
| 2017/0071698 | A1 * | 3/2017 | Maretto | A61C 5/40 |

FOREIGN PATENT DOCUMENTS

| | | |
|---|---|---|
| KR | 102120615 B1 | 6/2020 |
| WO | 2008102352 A1 | 8/2008 |
| WO | 2009103444 A1 | 8/2009 |
| WO | 2017075723 A1 | 5/2017 |
| WO | 2020243281 A1 | 12/2020 |

* cited by examiner

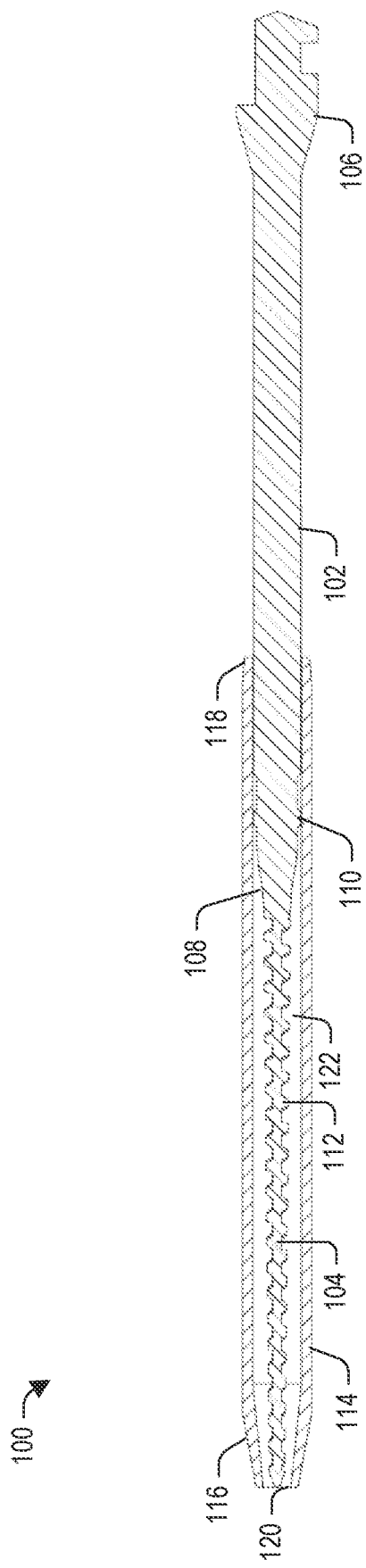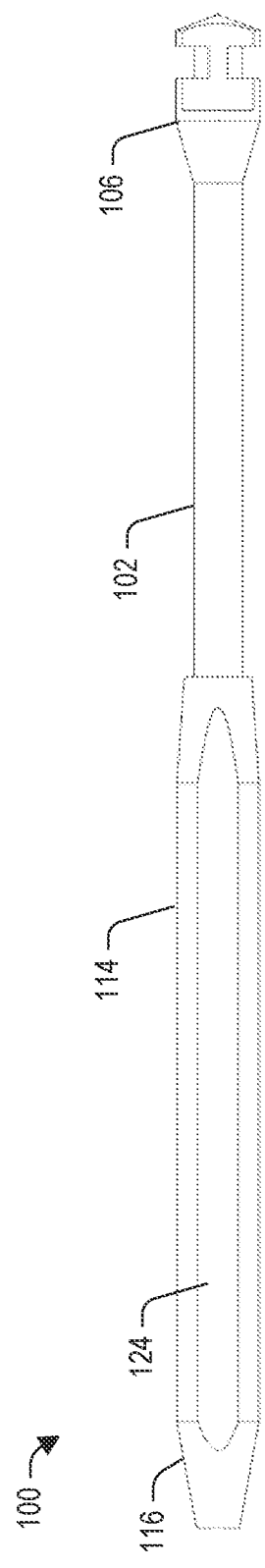

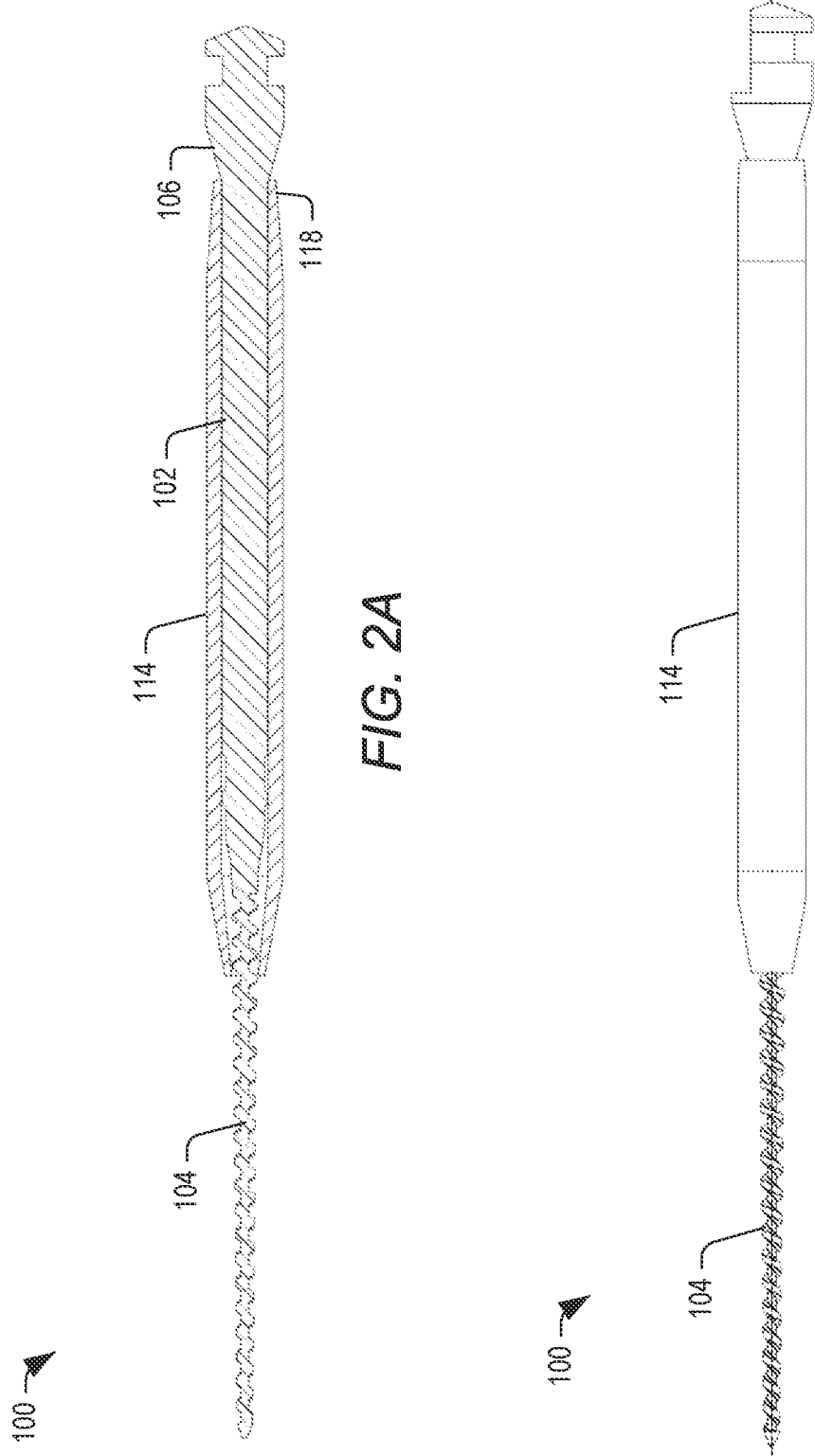

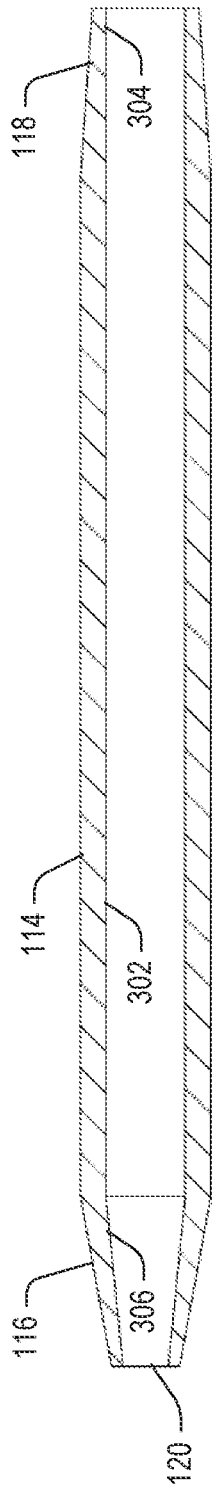
FIG. 3A
FIG. 3B

ROOT CANAL SEALING INSTRUMENT

RELATED APPLICATION

This application claims the benefit of provisional patent application Ser. No. 63/228,440, filed Aug. 2, 2021, the disclosure of which is hereby incorporated herein by reference in its entirety.

BACKGROUND

After removal of material from a root canal during a dental procedure, it is important to ensure that the main root canal and lateral canals are properly filled with sealant to prevent infections. This process is known as obturation.

SUMMARY

The embodiments disclosed herein include a root canal sealing instrument and a method for using the root canal sealing instrument.

In one embodiment, a root canal sealing instrument is provided. The root canal sealing instrument includes an elongated member that includes a shaft and a spiraled member. The root canal sealing instrument also includes a housing that encompasses at least a portion of the elongated member, wherein the housing is configured to slidably move with respect to the elongated member. The housing includes a proximal opening and a distal opening at opposing ends of the housing, wherein the proximal opening is closer to a proximal end of the elongated member than a distal end of the elongated member, and the distal opening is closer to the distal end of the elongated member than the proximal end of the elongated member. The housing also includes an interior chamber with a diameter at least as large as a first diameter of the spiraled member and a second diameter of the shaft.

In another embodiment, a method includes positioning an elongated member of a root canal sealing instrument at an opening of a root canal, wherein a first tapered portion of a housing encompassing the elongated member is in contact with a portion of a tooth. The method also includes inserting the elongated member into the root canal, wherein in response to inserting the elongated member, the housing slidably moves along the elongated member away from a tip of the elongated member in the root canal, wherein the elongated member comprises a spiraled member on a distal end of the elongated member. The method also includes, in response to the housing slidably moving along the elongated member, discharging filler from an opening of the first tapered portion of the housing into the opening of the root canal. The method also includes rotating the spiraled member, wherein, based on a rotation of the spiraled member and a seal between the housing and the elongated member, the filler is driven into the root canal.

In another embodiment, a root canal sealing instrument is provided. The root canal sealing instrument includes an elongated member that includes a shaft and a spiraled member. The root canal sealing instrument also includes a housing that includes a first opening and a second opening at opposed ends of the housing. The housing also includes an interior diameter sufficient to encompass at least a portion of the elongated member, wherein the housing is configured to slidably move with respect to the elongated member and wherein at least portions of the shaft and the spiraled member are positioned within the housing.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1A is a cut away diagram of a root canal sealing instrument according to one embodiment;

FIG. 1B is a diagram of a root canal sealing instrument according to one embodiment;

FIG. 2A is a cut away diagram of a root canal sealing instrument according to one embodiment;

FIG. 2B is a diagram of a root canal sealing instrument according to one embodiment;

FIG. 3A is a cut away diagram of a housing of a root canal sealing instrument according to one embodiment;

FIG. 3B is a diagram of a housing of a root canal sealing instrument according to one embodiment;

DETAILED DESCRIPTION

Figure 4:
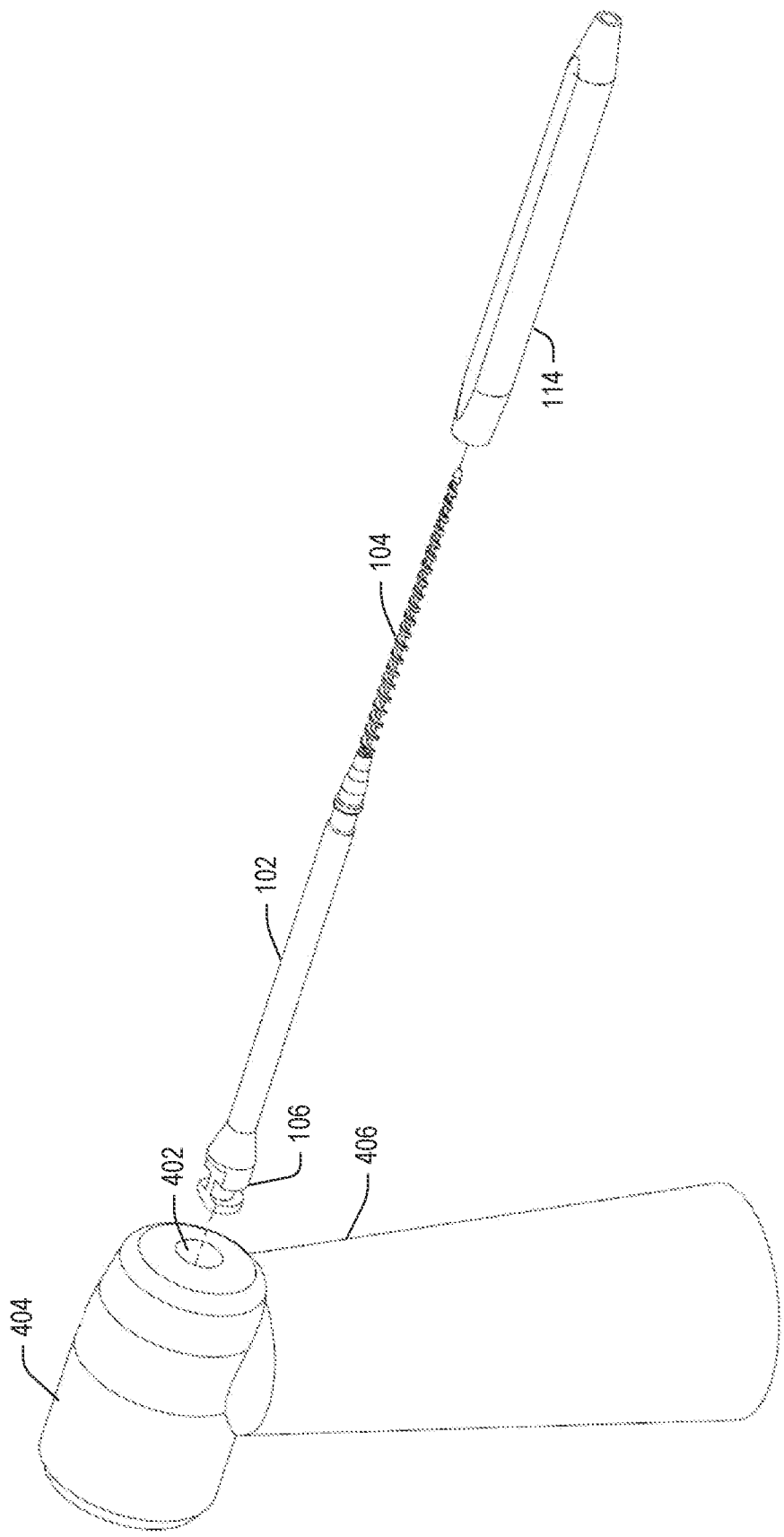
FIG. 4 is an exploded diagram of a root canal sealing instrument according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first format" and "second format," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

In various embodiments disclosed herein, provided is a root canal sealing instrument that can effectively deliver filler to a root canal. The filler can be one or a combination of various sealers or medicaments such as calcium hydroxide or others. The root canal sealing instrument includes an elongated member that has a spiraled member and a shaft that can be inserted into a cylindrical housing that can hold filler. The housing can initially cover the spiraled member, and, as the housing and spiraled member are applied to an opening of a root canal, the housing, which is too wide to be inserted into the root canal, comes into contact with the walls of the root canal, and slides back on the elongated member, discharging the filler into the root canal. As the spiraled member is rotated, the rotational movement causes the filler to be driven further into the root canal. The elongated member can then be retracted, with the filler left behind in the root canal.

FIG. 1A is a cut away diagram of a root canal sealing instrument according to one embodiment. The root canal sealing instrument (RCSI) 100 can include an elongated member that includes a shaft 102, a spiraled member 104 on a distal end of the elongated member, and a connecting end portion 106 on a proximal end of the elongated member that can be inserted into a motor-driven dental handpiece. In one embodiment, in between the shaft 102 and spiraled member 104 is a tapered portion 108 that has, on one end, a first diameter matching a shaft diameter and, on another end, a second diameter matching a spiraled member diameter. Between the tapered portion 108 and the shaft 102 is an annular flange 110 that encircles the elongated member. The spiraled member 104 can comprise one or more spiral flutes 112. The spiraled member 104 may comprise any suitable dimensions. In some embodiments, the spiraled member 104 has a length between about 8 millimeters (mm) and 35 mm and a diameter between about 0.10 mm and 2.00 mm. In an embodiment, the shaft 102 and/or spiraled member 104 can comprise a nylon material such as Rilsan™. In other embodiments, the shaft 102 and/or the spiraled member 104 can be comprised of a nickel-titanium alloy. In other embodiments, the spiraled member 104 can be made of a polymeric substance which allows the spiraled member 104 to bend and move into a root canal to follow the contour of the root canal. In other embodiments, the spiraled member 104 may be made of any other flexible material capable of withstanding the fatigue caused by rotation of the spiraled member 104.

A housing 114 can encompass the spiraled member 104 and a portion of the shaft 102. A distal end of the housing 114 can include a tapered portion 116 and a proximal end of the housing can include a tapered portion 118. The distal end of the housing 114 can also include an opening 120.

The housing 114 can include a chamber 122 in which the filler can reside. In an embodiment, the housing 114 can have any suitable dimensions. In one embodiment, the housing 114 has a length between about 8 mm and 35 mm and a diameter between about 0.30 mm and 2.0 mm. As will be illustrated below, the tapered portion 118 facilitates entry of the proximal end of the housing 114 into an opening of a head of a motor-driven dental handpiece when in use. The tapered portion 116 has a smallest exterior diameter that is configured to allow at least partial entry of the tapered portion 116 into an opening of the root canal, and a largest exterior diameter to inhibit a non-tapered portion of the housing 114 from entering the root canal. In one embodiment, the tapered portion 116 has a length between about 1 mm and 20 mm.

In an embodiment, the annular flange 110 that is sized to abut the interior surface of the housing 114 thereby inhibits the movement of filler beyond the annular flange 110 when the housing is slidably moved along the shaft 102. As the filler in the chamber 122 is blocked by the annular flange 110, the filler is thereby discharged out of the opening 120.

The shaft 102 may have any suitable dimensions. In one embodiment, the shaft 102 has a diameter between about 10 mm and about 30 mm.

Turning now to FIG. 1B, illustrated is a diagram of the RCSI 100 according to one embodiment. The exterior surface of the housing 114 may have grooves 124 or flattened portions on opposing sides of the housing 114. In an embodiment, the grooves 124 can prevent air from being trapped inside a dental handpiece head when the housing 114 is urged into an opening of the handpiece head.

Turning now to FIGS. 2A and 2B, illustrated are diagrams of the RCSI 100 according to one embodiment. In these diagrams, the housing 114 has been slidably moved along the shaft 102 to expose the spiraled member 104. In an embodiment, the housing 114 is prevented from sliding any further by the tapered portion 118 abutting the tapered portion of the connecting end portion 106.

In FIG. 2B, the RCSI 100 is rotated along a lengthwise axis by 90 degrees relative to the depiction in FIG. 1B. In an embodiment, the housing 114 and elongated member rotate in unison as the connecting end portion 106 is driven by the motor-driven dental handpiece. In other embodiments, the elongated member can rotate while the housing 114 stays stationary or rotates at a different speed.

Turning now to FIGS. 3A and 3B, illustrated are diagrams of the housing 114 of the RCSI 100 according to one embodiment. In an embodiment, the diameter of an interior wall 302 of the housing 114 in the non-tapered part of the housing 114 can match the diameter of the interior wall 304 that corresponds to the tapered portion 118. The matching diameters can facilitate the housing 114 sliding along the shaft. By contrast, in an embodiment, an interior wall 306 that corresponds to the tapered portion 116 can also be tapered such that the diameter at the opening 120 can be smaller than the diameter of the interior wall 302.

The grooves 124 can extend along the length of the housing 114 and into at least a portion of each of the tapered portions 116 and 118.

Turning now to FIG. 4, illustrated is an exploded diagram of the RCSI 100 according to one embodiment. The RCSI 100 and more specifically, the connecting end portion 106 of the elongated member, can be inserted into an instrument opening 402 of a head 404 of a motor-driven dental handpiece 406. Once inserted, the motor-driven dental handpiece 406 can rotate the elongated member and/or the housing 114 at a rate between 300 revolutions per minute (RPM) and 1000 RPM.

In an embodiment, the elongated member can be inserted into the instrument opening 402 before the housing 114 comprising the filler is slid onto the spiraled member 104 and a portion of the shaft 102. In other embodiments, the housing 114 can be slid onto the elongated member before the connecting end portion 106 is inserted into the instrument opening 402.

Figure 5:
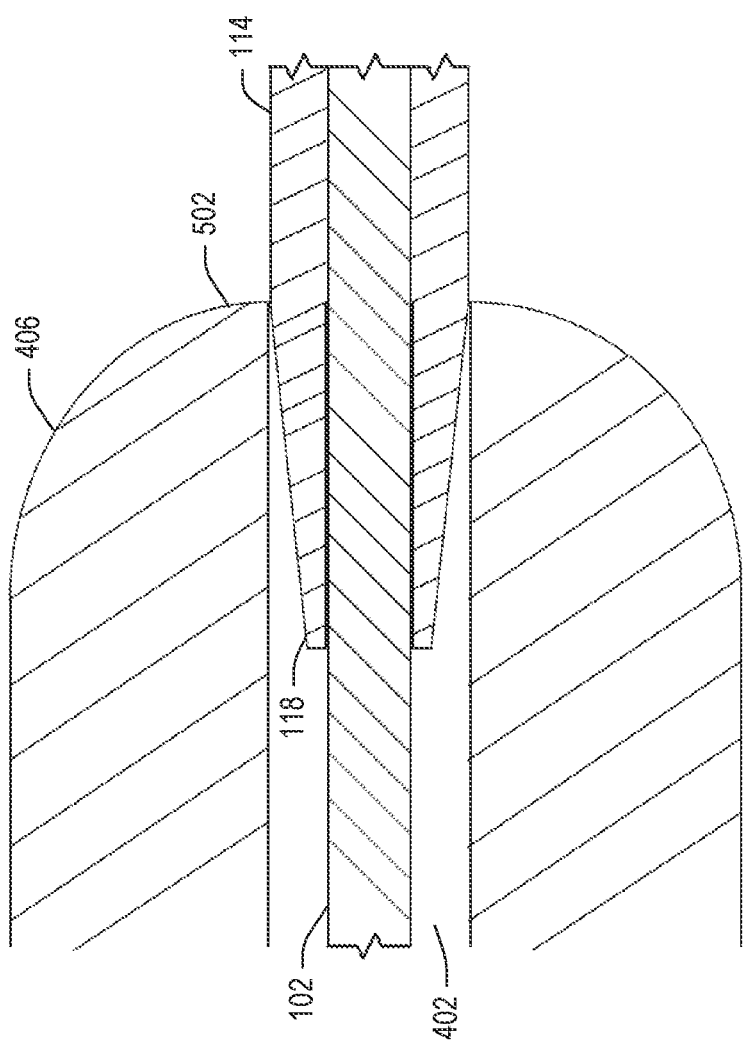
FIG. 5 is a cut away diagram of a root canal sealing instrument according to one embodiment.

Turning now to FIG. 5, illustrated is a cut away diagram of the RCSI 100 according to one embodiment. In particular, the embodiment shown in FIG. 5 depicts the tapered portion 118 of the housing 114 being inserted into the instrument opening 402 as the housing 114 is slidably moved back along the shaft 102. The tapered portion 118 can facilitate the housing 114 entering the instrument opening 402 without abutting a face 502 of the motor-driven dental handpiece 406.

Figure 6A:
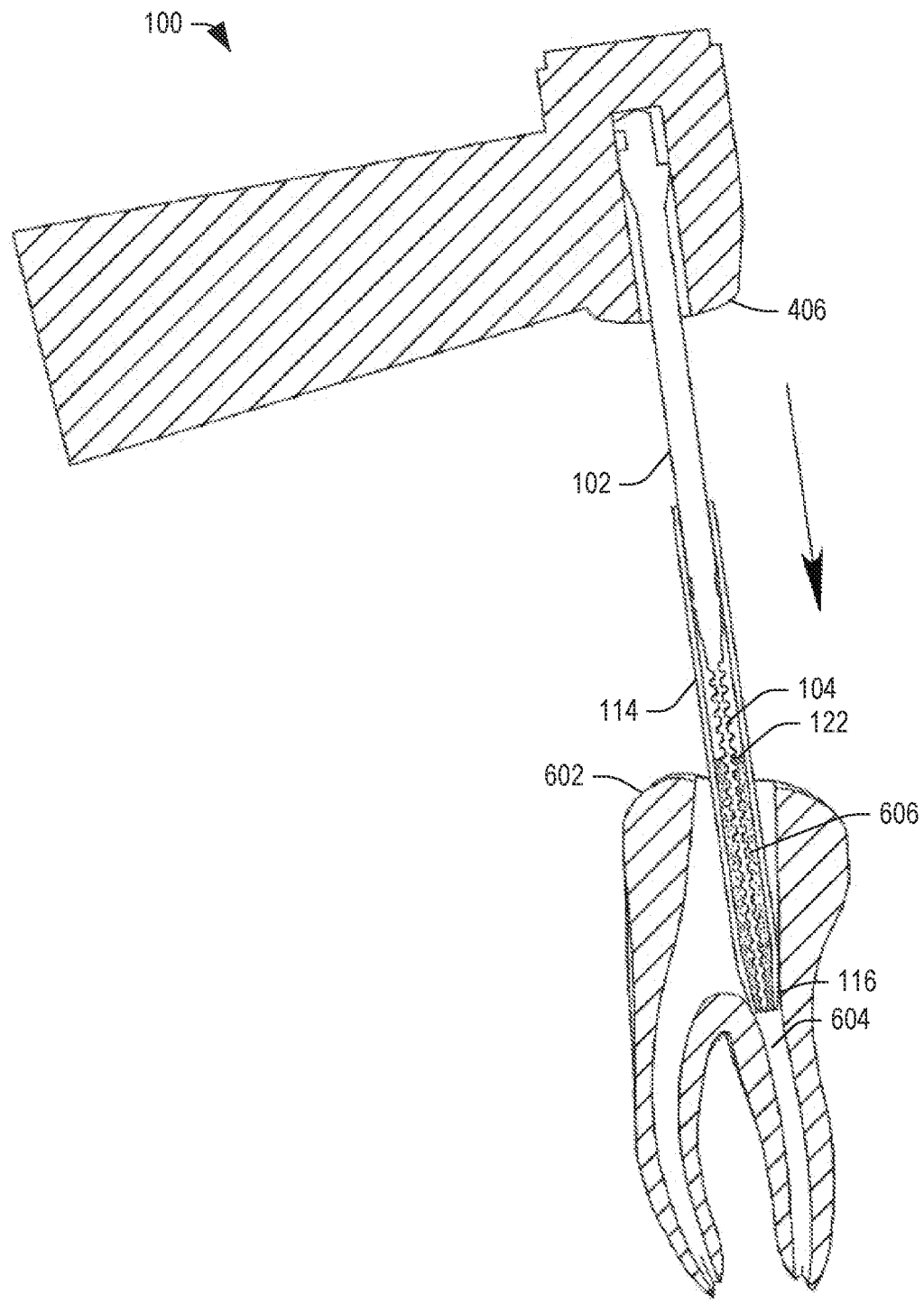
FIG. 6A is a cut away diagram of a root canal sealing instrument sealing a tooth according to one embodiment.

Turning now to FIG. 6A, illustrated is a cut away diagram of the RCSI 100 sealing a tooth 602 according to one embodiment. The spiraled member 104 and housing 114 are inserted into the tooth 602 until the housing 114 abuts the sides of an opening of a root canal 604. The chamber 122 in the housing can include filler 606 that will be discharged into the root canal 604. The tapered portion 116 can at least partially enter the root canal 604 due to the narrower width of the tapered portion 116 relative to a main part of the housing 114. In an embodiment, a smaller external diameter of the tapered portion 116 is smaller than the opening of the root canal 604, and a larger external diameter of the tapered portion 116 is larger than the opening of the root canal 604. At this point, the filler 606 is ready to be injected into the root canal 604.

Figure 6B:
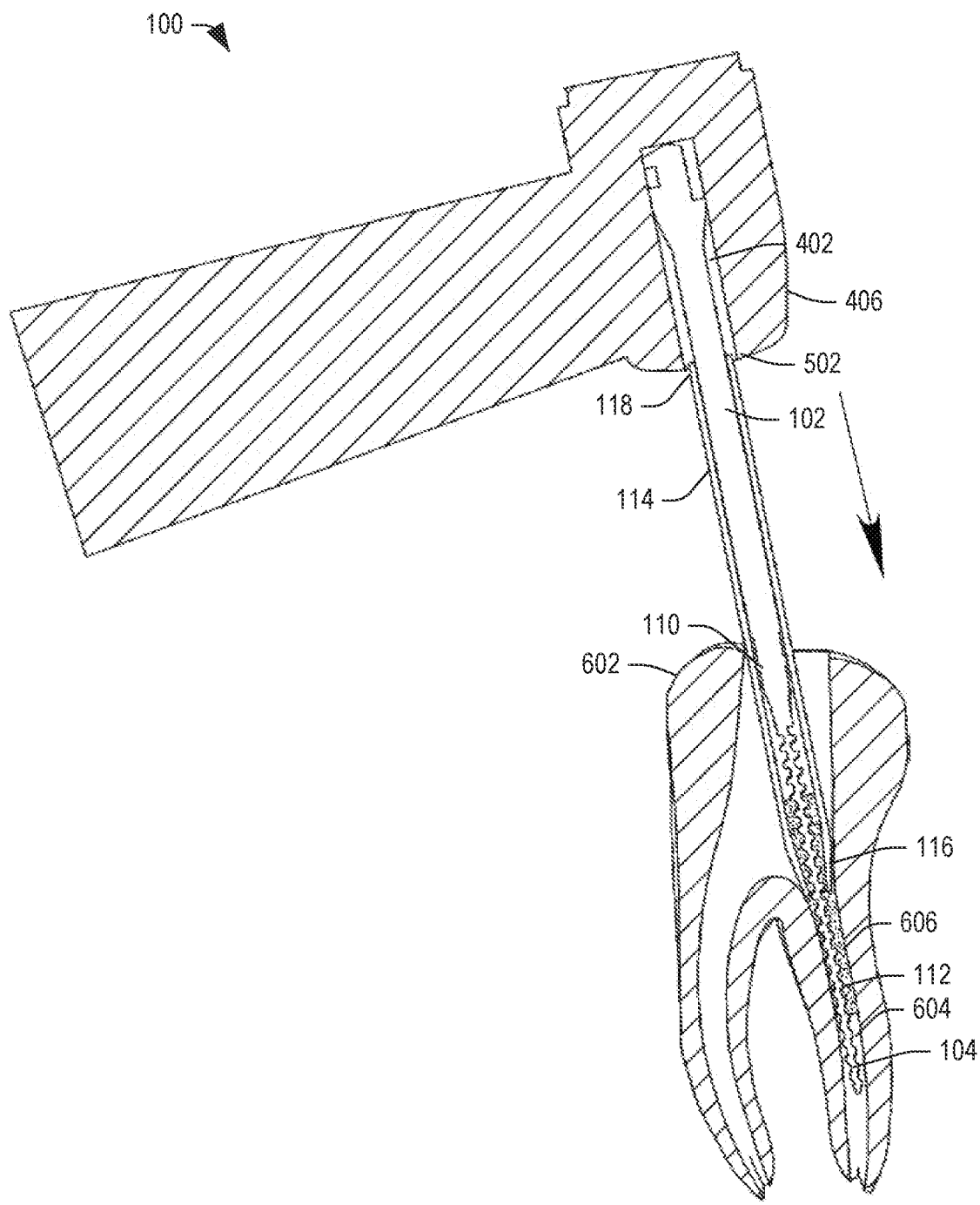
FIG. 6B is a cut away diagram of a root canal sealing instrument sealing a tooth according to one embodiment.

Referring now to FIG. 6B, the dentist initiates rotation of the shaft 102 by the motor-driven dental handpiece 406 and slowly urges the spiraled member 104 into the root canal 604. As the spiraled member 104 enters the root canal 604 and is urged forward, the housing 114 comes into contact with walls of the root canal 604, causing the housing 114 to slidably move with respect to the elongated member toward the motor-driven dental handpiece 406 and into the instrument opening 402 in response to the forward movement of the motor-driven dental handpiece 406. As the housing 114 moves back, with respect to the tip of the spiraled member 104, the filler 606 is discharged from the housing 114 and urged forward and down into the root canal 604 by the continuously rotating the spiraled member 104. The tapered portion 118 of the housing 114 allows the housing 114 to enter the instrument opening 402 of the motor-driven dental handpiece 406 without catching on a rim of the face 502 of the instrument opening 402. The housing 114 may or may not be rotating along with the shaft 102.

The filler 606 is dispensed from within the housing 114 and urged forward into the root canal 604 by the air pressure created between the annular flange 110 and the filler 606. Once the air pressure is exhausted, the annular flange 110 and the spiraled member 104 further dispense the filler 606 both forward and laterally into the root canal 604.

Figure 6C:
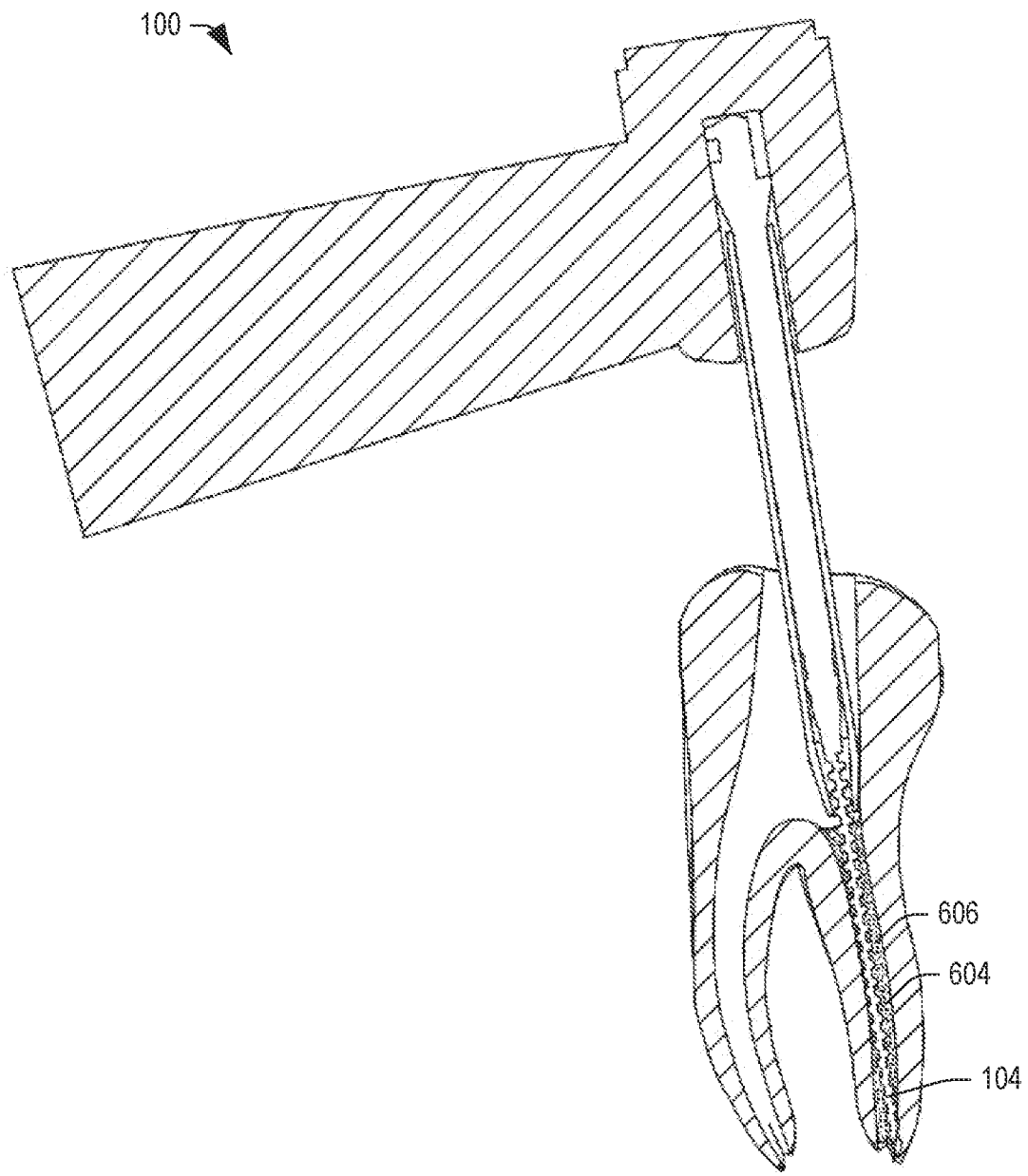
FIG. 6C is a cut away diagram of a root canal sealing instrument sealing a tooth according to one embodiment.

Referring now to FIG. 6C, the obturation is complete, and the dentist will begin to remove the RCSI 100 from the root canal 604. Note that the rotation of and taper of the spiraled member 104 urges the filler 606 into both the root canal 604 as well as lateral canals, when they are present.

Figure 6D:
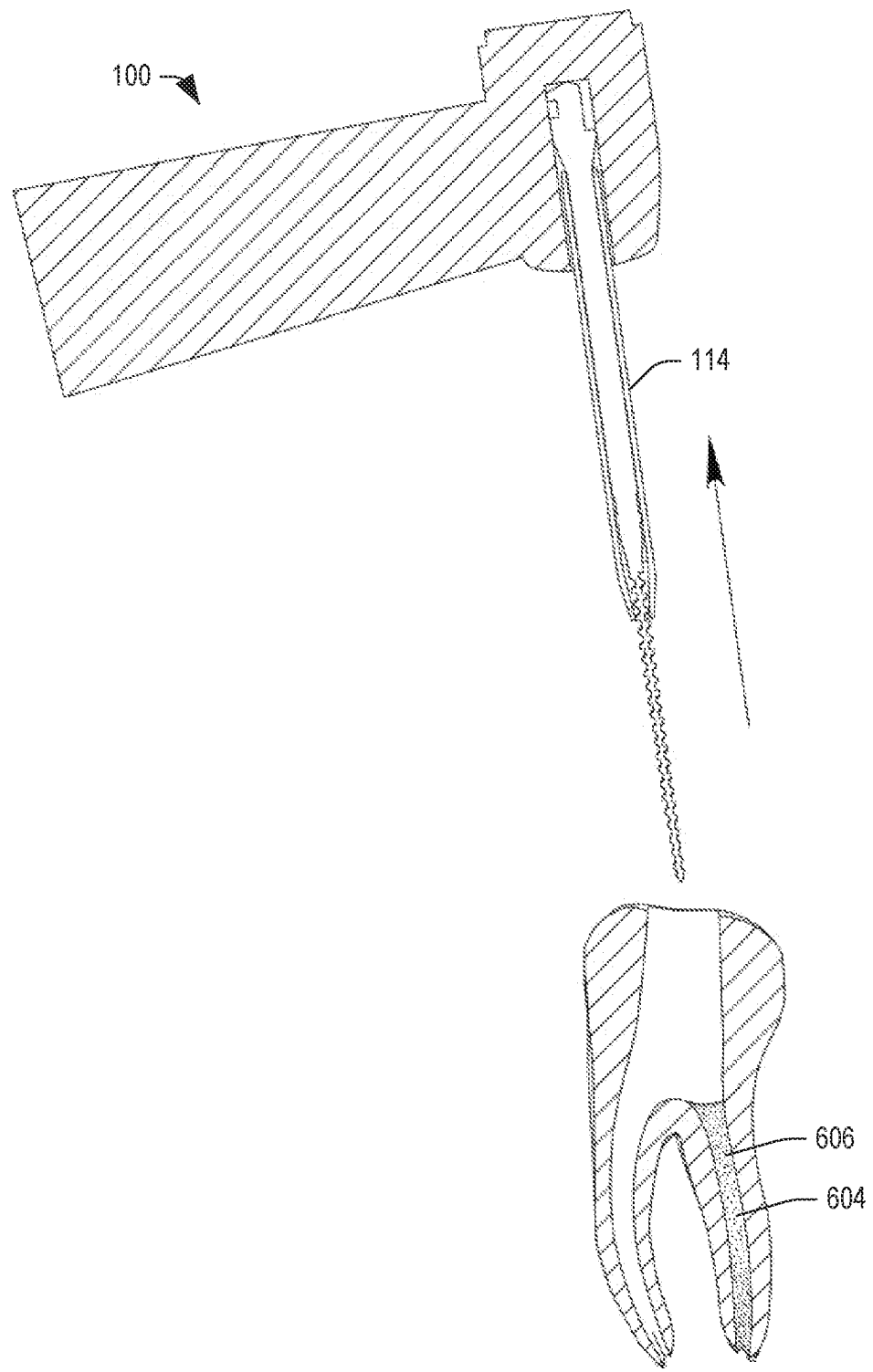
FIG. 6D is a cut away diagram of a root canal sealing instrument sealing a tooth according to one embodiment.

Referring to FIG. 6D, the dentist has completely removed the RCSI 100 from the tooth, and the obturation is complete. All or a portion of the filler 606 once inside the housing 114 is now in the root canal 604.

Figure 7:
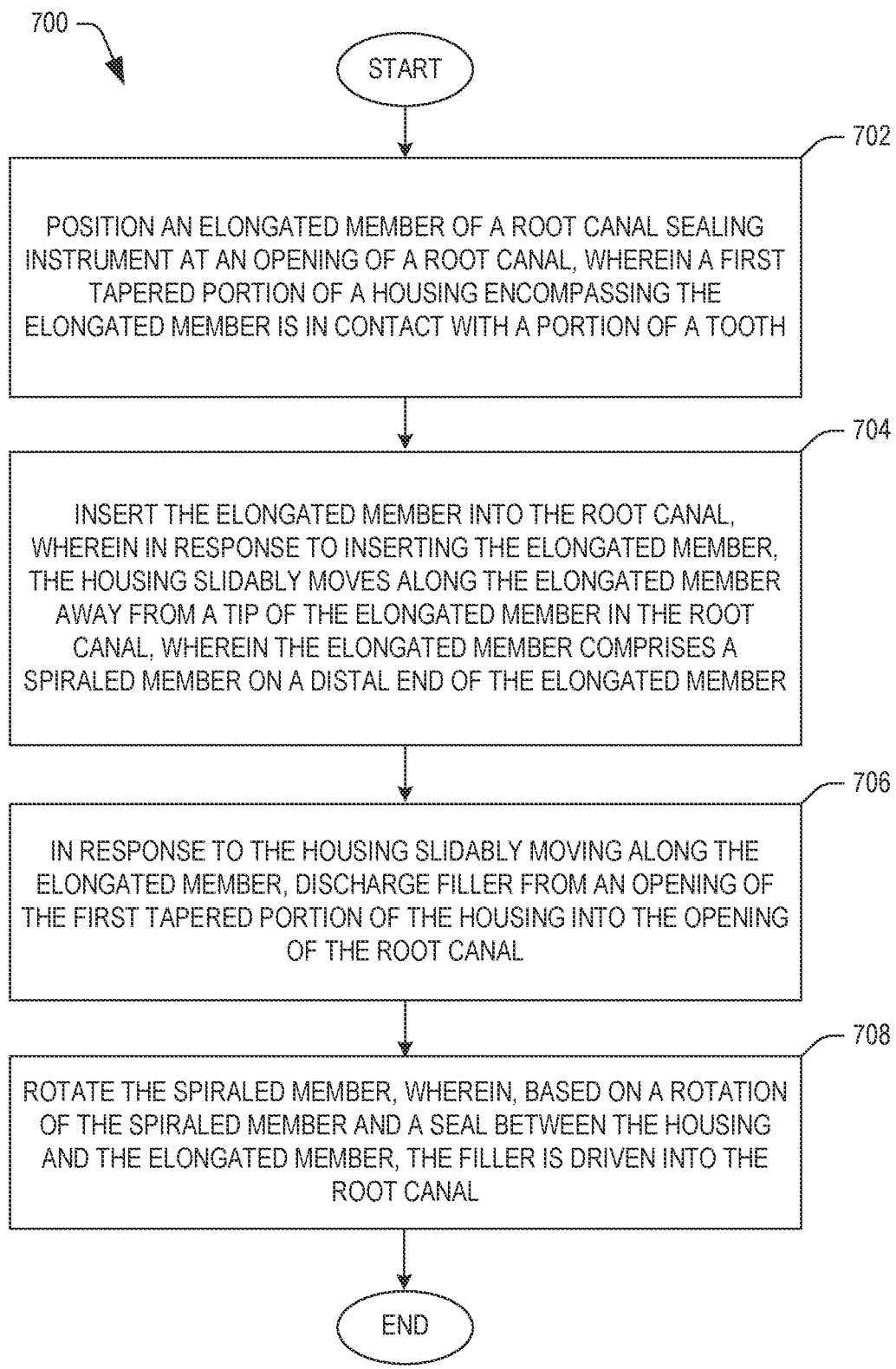
FIG. 7 is a flowchart of a method for using a root canal sealing instrument according to one embodiment.

FIG. 7 illustrates a process in connection with the aforementioned RCSI 100. FIG. 7 will be discussed in conjunction with FIGS. 6A-6D. While for purposes of simplicity of explanation, the method is shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is a flowchart of a method 700 for using an RCSI according to one embodiment.

At step 702, the method includes positioning an elongated member of the RCSI 100 at an opening of the root canal 604, wherein a first tapered portion (e.g., the tapered portion 116) of the housing 114 encompassing the elongated member is in contact with a portion of a tooth 602.

At step 704, the method includes inserting the elongated member into the root canal 604, wherein in response to the inserting the elongated member, the housing 114 slidably moves along the elongated member away from a tip of the elongated member in the root canal 604, wherein the elongated member comprises the spiraled member 104 on a distal end of the elongated member.

At step 706, the method includes, in response to the housing 114 slidably moving along the elongated member, discharging the filler 606 from the opening 120 of the tapered portion 116 of the housing 114 into the opening of the root canal 604.

At step 708, the method includes rotating the spiraled member 104, wherein based on a rotation of the spiraled member 104 and a seal (e.g., the annular flange) between the housing 114 and the elongated member, the filler 606 is driven into the root canal 604.

Those skilled in the art will recognize improvements and modifications to the preferred embodiments of the disclosure. All such improvements and modifications are considered within the scope of the concepts disclosed herein and the claims that follow.

What is claimed is:

1. A root canal sealing instrument comprising:
    an elongated member comprising:
        a shaft; and
        a spiraled member;
    a housing that encompasses at least a portion of the elongated member, wherein the housing is slidably connected to the elongated member, the housing comprising:
        a proximal opening and a distal opening at opposing ends of the housing, wherein the proximal opening is closer to a proximal end of the elongated member than a distal end of the elongated member, and the distal opening is closer to the distal end of the elongated member than the proximal end of the elongated member; and
        an interior chamber with a diameter at least as large as a first diameter of the spiraled member and a second diameter of the shaft;
    and wherein, in a first position with respect to the elongated member, the housing encompasses more than 75% of a length of the spiraled member and wherein the housing is further operable to slide along the elongated member to further expose the spiraled member to a root canal.

2. The root canal sealing instrument of claim 1, wherein the housing is configured to, upon contact with a wall of the root canal, slide towards the proximal end of the elongated member and cause filler to be discharged out of the distal opening.

3. The root canal sealing instrument of claim 1 wherein the housing has a first tapered end portion at the proximal opening, wherein the first tapered end portion is configured to facilitate entry of a portion of the housing into an instrument opening of a motor-driven dental handpiece.

4. The root canal sealing instrument of claim 3 wherein the housing has a second tapered end portion at the distal opening, wherein the second tapered end portion is configured to allow a partial entry of the second tapered end portion into an opening of the root canal.

5. The root canal sealing instrument of claim 4, wherein a smaller external diameter of the second tapered end portion is smaller than the opening of the root canal, and a larger external diameter of the second tapered end portion is larger than the opening of the root canal to inhibit a non-tapered portion of the housing from entering the root canal.

6. The root canal sealing instrument of claim 1, wherein the first diameter of the spiraled member is smaller than the second diameter of the shaft, and wherein the elongated member further comprises:
a tapered portion in between the shaft and the spiraled member.

7. The root canal sealing instrument of claim 6, wherein the elongated member further comprises:
an annular flange on the shaft that is configured to form a seal between the housing and the elongated member.

8. The root canal sealing instrument of claim 1, wherein the elongated member further comprises a connecting end portion at the proximal end of the elongated member.

9. The root canal sealing instrument of claim 8, further comprising:
a motor-driven dental handpiece comprising an instrument opening configured to receive the connecting end portion, wherein the motor-driven dental handpiece is further configured to rotate the elongated member at a rotational speed between 300-1000 revolutions per minute.

10. The root canal sealing instrument of claim 1 wherein, in the first position with respect to the elongated member, the housing is operable to house a filler in a void between the housing and the spiraled member and wherein the housing is further operable to slide along the elongated member to thereby discharge the filler from the distal opening.

11. A method, comprising:
positioning an elongated member of a root canal sealing instrument at an opening of a root canal, wherein a first tapered portion of a housing encompassing the elongated member is in contact with a portion of a tooth;
inserting the elongated member into the root canal, wherein in response to inserting the elongated member, the housing slidably moves along the elongated member away from a tip of the elongated member in the root canal, wherein the elongated member comprises a spiraled member on a distal end of the elongated member;
in response to the housing slidably moving along the elongated member, discharging filler from an opening of the first tapered portion of the housing into the opening of the root canal; and
rotating the spiraled member, wherein, based on a rotation of the spiraled member and a seal between the housing and the elongated member, the filler is driven into the root canal.

12. The method of claim 11, further comprising:
withdrawing the elongated member from the root canal, wherein the filler seals the opening of the root canal.

13. The method of claim 11, further comprising:
prior to positioning the elongated member of the root canal sealing instrument at the opening of the root canal, sliding the housing comprising the filler onto the elongated member.

14. A root canal sealing instrument comprising:
an elongated member comprising:
a shaft; and
a spiraled member;
a housing comprising:
a first opening and a second opening at opposed ends of the housing;
an interior diameter sufficient to encompass at least a portion of the elongated member, wherein the housing is slidably connected to the elongated member and wherein at least portions of the shaft and the spiraled member are positioned within the housing; and
an annular flange on the shaft that is configured to form a seal between the housing and the elongated member.

15. The root canal sealing instrument of claim 14, wherein, in response to the housing sliding towards a proximal end of the elongated member, filler located within the housing is discharged out of a distal opening.

16. The root canal sealing instrument of claim 14, wherein the housing has a first tapered end portion at a proximal opening, wherein the first tapered end portion is configured to facilitate entry of a portion of the housing into an instrument opening of a motor-driven dental handpiece.

17. The root canal sealing instrument of claim 16, wherein the housing has a second tapered end portion at a distal opening, wherein the second tapered end portion is configured to allow a partial entry of the second tapered end portion into an opening of a root canal.

18. The root canal sealing instrument of claim 17, wherein a smaller external diameter of the second tapered end portion is smaller than the opening of the root canal, and a larger external diameter of the second tapered end portion is larger than the opening of the root canal.

19. The root canal sealing instrument of claim 14, wherein the shaft has a first diameter, and the spiraled member has a second diameter, wherein the second diameter is smaller than the first diameter, and wherein the elongated member further comprises:
a tapered portion between the shaft and the spiraled member.

* * * * *